United States Patent
Ripley et al.

(10) Patent No.: US 11,697,303 B2
(45) Date of Patent: *Jul. 11, 2023

(54) DIGITAL PRINTING FOR FLOORING AND DECORATIVE STRUCTURES

(71) Applicant: Interface, Inc., Atlanta, GA (US)

(72) Inventors: Graeme Robert Ripley, LaGrange, GA (US); John Proctor Bradford, LaGrange, GA (US)

(73) Assignee: Interface, Inc., Atlanta, GA (US)

( * ) Notice: Subject to any disclaimer, the term of this patent is extended or adjusted under 35 U.S.C. 154(b) by 90 days.

This patent is subject to a terminal disclaimer.

(21) Appl. No.: 17/478,295

(22) Filed: Sep. 17, 2021

(65) Prior Publication Data

US 2022/0001607 A1   Jan. 6, 2022

Related U.S. Application Data

(63) Continuation of application No. 16/557,109, filed on Aug. 30, 2019, now Pat. No. 11,203,224.
(Continued)

(51) Int. Cl.
*G06K 15/00* (2006.01)
*B44F 9/02* (2006.01)
(Continued)

(52) U.S. Cl.
CPC .............. *B44F 9/02* (2013.01); *B29C 64/188* (2017.08); *B29C 64/393* (2017.08); *E04F 15/02* (2013.01);
(Continued)

(58) Field of Classification Search
CPC ....... B44F 9/02; B29C 64/188; B29C 64/393; E04F 15/02; G06T 15/08; G06T 15/80;
(Continued)

(56) References Cited

U.S. PATENT DOCUMENTS 4,849,768 A   7/1989  Graham
4,979,380 A   12/1990 Robbins et al.
(Continued)

FOREIGN PATENT DOCUMENTS

DE   102015206941   11/2016
EP       2155490    2/2010
(Continued)

OTHER PUBLICATIONS

Application No. EP19854899.2, Extended European Search Report, dated Apr. 14, 2022, 7 pages.
(Continued)

*Primary Examiner* — Gabriel I Garcia
(74) *Attorney, Agent, or Firm* — Kilpatrick Townsend Stockton LLP

(57) ABSTRACT

Certain aspects and features relate to using an image modifier to generate digital designs and to printing the digital designs on a structure for flooring or other decoration that can more realistically mimic designs found in nature or otherwise provide designers with the freedom to create aesthetic designs more easily. An image modifier can receive an image, such as an image of a naturally occurring view and generate modified designs based on the image. The modified designs can be slight modifications to the image and printed on the structures for flooring such that together the printed structures exhibit the appearance of a design found in nature or a desired appearance by a designer.

20 Claims, 5 Drawing Sheets

Related U.S. Application Data

(60) Provisional application No. 62/724,800, filed on Aug. 30, 2018.

(51) Int. Cl.
| | |
|---|---|
| *B29C 64/188* | (2017.01) |
| *B29C 64/393* | (2017.01) |
| *G06T 15/08* | (2011.01) |
| *G06T 15/80* | (2011.01) |
| *E04F 15/02* | (2006.01) |
| *H04N 1/387* | (2006.01) |
| *H04N 1/00* | (2006.01) |
| *B33Y 50/02* | (2015.01) |
| *B41J 3/407* | (2006.01) |
| *B33Y 10/00* | (2015.01) |

(52) U.S. Cl.
CPC ............. *G06T 15/08* (2013.01); *G06T 15/80* (2013.01); *H04N 1/00456* (2013.01); *H04N 1/387* (2013.01); *B33Y 10/00* (2014.12); *B33Y 50/02* (2014.12); *B41J 3/4073* (2013.01)

(58) Field of Classification Search
CPC .... H04N 1/00456; H04N 1/387; B33Y 10/00; B33Y 50/02; B41J 3/4073
USPC ........................................................ 264/241
See application file for complete search history.

(56) References Cited

U.S. PATENT DOCUMENTS

| | | | |
|---|---|---|---|
| 5,707,689 A | 1/1998 | Hori | |
| 5,866,225 A | 2/1999 | Crossley | |
| 6,655,798 B2 | 12/2003 | Temple | |
| 6,888,147 B1 | 5/2005 | Hansson et al. | |
| 6,991,830 B1 | 1/2006 | Hansson et al. | |
| 7,003,364 B1 | 2/2006 | Hansson et al. | |
| 7,081,291 B2 | 7/2006 | Courtoy et al. | |
| 7,431,860 B2 | 10/2008 | Kawase | |
| 7,542,818 B2 | 6/2009 | Hansson et al. | |
| 7,914,098 B2 | 3/2011 | Albrecht et al. | |
| 7,947,139 B2 | 5/2011 | Endert | |
| 8,153,234 B2 | 4/2012 | Nollet et al. | |
| 8,182,630 B2 | 5/2012 | Canet et al. | |
| 8,465,804 B2 | 6/2013 | Provoost et al. | |
| 8,741,421 B2 | 6/2014 | Hansson et al. | |
| 8,758,881 B2 | 6/2014 | Rehker et al. | |
| 8,944,543 B2 | 2/2015 | Hansson et al. | |
| 8,950,138 B2 | 2/2015 | Hansson et al. | |
| 9,266,382 B2 | 2/2016 | Schacht et al. | |
| 9,290,040 B2 | 3/2016 | Verhaeghe | |
| 9,315,994 B2 | 4/2016 | Chen | |
| 9,340,033 B2 | 5/2016 | Frati | |
| 9,409,382 B2 | 8/2016 | Hakansson et al. | |
| 9,409,412 B2 | 8/2016 | Hansson et al. | |
| 9,446,602 B2 | 9/2016 | Pervan | |
| 9,453,348 B1 | 9/2016 | Meersseman et al. | |
| 9,502,656 B2 | 11/2016 | Joseph et al. | |
| 9,527,304 B2 | 12/2016 | Bauer | |
| 9,636,922 B2 | 5/2017 | Hansson et al. | |
| 9,656,476 B2 | 5/2017 | Hansson et al. | |
| 9,724,932 B2 | 8/2017 | Torfs et al. | |
| 9,744,716 B2 | 8/2017 | Dohring | |
| 9,828,777 B2 | 11/2017 | Dohring | |
| 9,840,091 B2 | 12/2017 | Cloots et al. | |
| 9,874,030 B2 | 1/2018 | Thiers et al. | |
| 9,914,323 B2 | 3/2018 | Van Garsse et al. | |
| 9,956,814 B2 | 5/2018 | Vermeulen | |
| 9,962,862 B2 | 5/2018 | Espe | |
| 10,022,956 B2 | 7/2018 | De Mondt et al. | |
| 10,035,358 B2 | 7/2018 | Pervan et al. | |
| 10,047,529 B2 | 8/2018 | Vandevoorde et al. | |
| 10,052,889 B2 | 8/2018 | Yang | |
| 10,071,456 B2 | 9/2018 | Rees et al. | |
| 10,071,563 B2 | 9/2018 | Pervan | |
| 10,112,426 B2 | 10/2018 | Van Den Bergen et al. | |
| 10,239,346 B2 | 3/2019 | Vermeulen | |
| 10,308,056 B2 | 6/2019 | De Mondt et al. | |
| 10,369,837 B2 | 8/2019 | Ryberg et al. | |
| 10,471,769 B2 | 11/2019 | Clement | |
| 10,513,855 B2 | 12/2019 | Feys et al. | |
| 10,570,627 B2 | 2/2020 | Potter | |
| 10,625,494 B2 | 4/2020 | Lenaerts et al. | |
| 10,661,548 B2 | 5/2020 | Klackmann-Schneider et al. | |
| 10,730,332 B2 | 8/2020 | De Mondt | |
| 10,759,205 B2 | 9/2020 | Forget et al. | |
| 10,814,648 B1 | 10/2020 | Clement et al. | |
| 10,899,166 B2 | 1/2021 | Pervan et al. | |
| 10,940,680 B2 | 3/2021 | Naeyaert | |
| 10,941,579 B2 | 3/2021 | Clement | |
| 10,960,644 B2 | 3/2021 | Peres et al. | |
| 10,994,555 B2 | 5/2021 | Clement et al. | |
| 11,014,378 B2 | 5/2021 | Pervan et al. | |
| 11,059,320 B2 | 7/2021 | Schacht et al. | |
| 11,077,652 B2 | 8/2021 | Pervan | |
| 11,117,410 B2 | 9/2021 | Clement | |
| 11,203,224 B2 * | 12/2021 | Ripley | ................. G06F 3/1244 |
| 2003/0203165 A1 | 10/2003 | Nobles et al. | |
| 2004/0051903 A1 | 3/2004 | Lapstun et al. | |
| 2005/0249923 A1 | 11/2005 | Reichwein et al. | |
| 2006/0099386 A1 | 5/2006 | Smith | |
| 2006/0188757 A1 | 8/2006 | Magnusson | |
| 2007/0121166 A1 | 5/2007 | Hess | |
| 2007/0166516 A1 | 7/2007 | Kim et al. | |
| 2008/0259360 A1 | 10/2008 | Kacker et al. | |
| 2009/0120249 A1 | 5/2009 | Gauss et al. | |
| 2010/0009102 A1 | 1/2010 | Vermeulen | |
| 2010/0046010 A1 | 2/2010 | Bauer | |
| 2010/0183822 A1 | 7/2010 | Ruggie et al. | |
| 2010/0196678 A1 | 8/2010 | Vermeulen | |
| 2011/0013211 A1 | 1/2011 | Grosz et al. | |
| 2011/0200750 A1 | 8/2011 | Meersseman et al. | |
| 2012/0180944 A1 | 7/2012 | Van Hooydonck | |
| 2013/0122255 A1 | 5/2013 | Chen | |
| 2013/0203165 A1 | 8/2013 | Fadeev et al. | |
| 2014/0290171 A1 | 10/2014 | Vermeulen | |
| 2014/0342125 A1 | 11/2014 | Rees et al. | |
| 2015/0030817 A1 | 1/2015 | Wiegelmann et al. | |
| 2015/0239230 A1 | 8/2015 | Vermeulen | |
| 2015/0251486 A1 | 9/2015 | Hannig | |
| 2015/0258716 A1 | 9/2015 | Hanning | |
| 2016/0303761 A1 | 10/2016 | Stahl | |
| 2017/0053164 A1 | 2/2017 | Eagleton et al. | |
| 2017/0058456 A1 | 3/2017 | Loccufier et al. | |
| 2017/0350142 A1 | 12/2017 | Ferlay et al. | |
| 2019/0023060 A1 | 1/2019 | Maertens et al. | |
| 2019/0315087 A1 | 10/2019 | Macor | |
| 2020/0023662 A1 | 1/2020 | Pankoke | |
| 2020/0207118 A1 | 7/2020 | Lenaerts et al. | |
| 2020/0346246 A1 | 11/2020 | Pankoke | |
| 2020/0368777 A1 | 11/2020 | Pankoke | |
| 2020/0377711 A1 | 12/2020 | Dai et al. | |
| 2021/0053335 A1 | 2/2021 | Vermeulen | |
| 2021/0146710 A1 | 5/2021 | Clement et al. | |
| 2021/0187823 A1 | 6/2021 | Macor | |
| 2021/0213767 A1 | 7/2021 | Meeus et al. | |
| 2021/0245544 A1 | 8/2021 | Barberan Latorre | |
| 2021/0268542 A1 | 9/2021 | Pankoke | |

FOREIGN PATENT DOCUMENTS

| | | |
|---|---|---|
| EP | 2202056 | 6/2010 |
| EP | 2218520 | 8/2010 |
| EP | 2233287 | 9/2010 |
| EP | 2313281 | 4/2011 |
| EP | 2367691 | 9/2011 |
| EP | 2431190 | 3/2012 |
| EP | 2480416 | 8/2012 |
| EP | 2558306 | 2/2013 |
| EP | 2596959 | 5/2013 |
| EP | 2695746 | 2/2014 |
| EP | 2789476 | 10/2014 |
| EP | 2875949 | 5/2015 |

(56) References Cited

FOREIGN PATENT DOCUMENTS

| | | |
|---|---|---|
| EP | 2927017 | 10/2015 |
| EP | 2927018 | 10/2015 |
| EP | 3098043 | 11/2016 |
| EP | 3109056 | 12/2016 |
| EP | 3381710 | 10/2018 |
| EP | 3456900 | 3/2019 |
| EP | 3656571 | 5/2020 |
| EP | 3693180 | 8/2020 |
| EP | 3705304 | 9/2020 |
| EP | 3827976 | 6/2021 |
| EP | 3865308 | 8/2021 |
| IT | MI20041031 | 8/2004 |
| IT | MI20070529 | 9/2008 |
| IT | MI20071212 | 12/2008 |
| IT | MI20080688 | 10/2009 |
| IT | MI20081446 | 2/2010 |
| JP | 2004086664 | 3/2004 |
| JP | 2005318637 | 11/2005 |
| WO | 2005116124 | 12/2005 |
| WO | 2008152137 | 12/2008 |
| WO | 2009066081 | 5/2009 |
| WO | 2018069874 | 4/2018 |
| WO | 2018197531 | 11/2018 |
| WO | 2020054646 | 3/2020 |
| WO | 2020095196 | 5/2020 |
| WO | 2020194202 | 10/2020 |
| WO | 2021055211 | 3/2021 |

OTHER PUBLICATIONS

Application No. PCT/US2019/048959, International Search Report and Written Opinion, dated Dec. 19, 2019, 12 pages.

\* cited by examiner

DIGITAL PRINTING FOR FLOORING AND DECORATIVE STRUCTURES

CROSS-REFERENCE TO RELATED APPLICATION

This is a continuation of U.S. Non-Provisional application Ser. No. 16/557,109 filed Aug. 30, 2019, which claims priority to U.S. Provisional Application Ser. No. 62/724,800, titled "Digital Printing for Flooring and Decorative Structures" and filed Aug. 30, 2018 each of which is incorporated herein by reference.

TECHNICAL FIELD

This disclosure relates generally to flooring or other decorative structures. More specifically, but not by way of limitation, this disclosure relates to printing images on structures for use as flooring or other decorative structures.

BACKGROUND

Flooring and decorative structures can be made to include a variety of different colors and images. Printing techniques include screen-printing and digitally controlled printing, among other techniques. These techniques print an image or color to multiple substrates. These techniques can limit possible designs on a substrate to the actual images or designs on which the printing is based.

SUMMARY

In one example, a system includes a digital printer and a computing device. The digital printer is configured to print modified images onto blanks for flooring or other decoration. The computing device includes a processor and a non-transitory computer-readable medium having instructions stored thereon that are executable by the processor to perform operations. The operations include: receiving a digital file with image information; generating the modified images based on the image information by modifying one or more parameters of the information; and transmitting the modified images to the digital printer.

In another example, a computing device includes a processor and a non-transitory computer-readable medium having instructions stored thereon that are executable by the processor to perform operations. The operations includes: receiving a digital file with image information; generating modified images based on the image information by modifying one or more parameters of the information; and transmitting the modified images to a digital printer for printing the modified images onto blanks for flooring or other decoration.

In another example, a method includes: receiving, by a computing device, a digital file with image information; generating, by the computing device, modified images based on the image information by modifying one or more parameters of the information; and transmitting, by the computing device, the modified images to a digital printer for printing the modified images onto blanks for flooring or other decoration.

DETAILED DESCRIPTION

Figure 1:
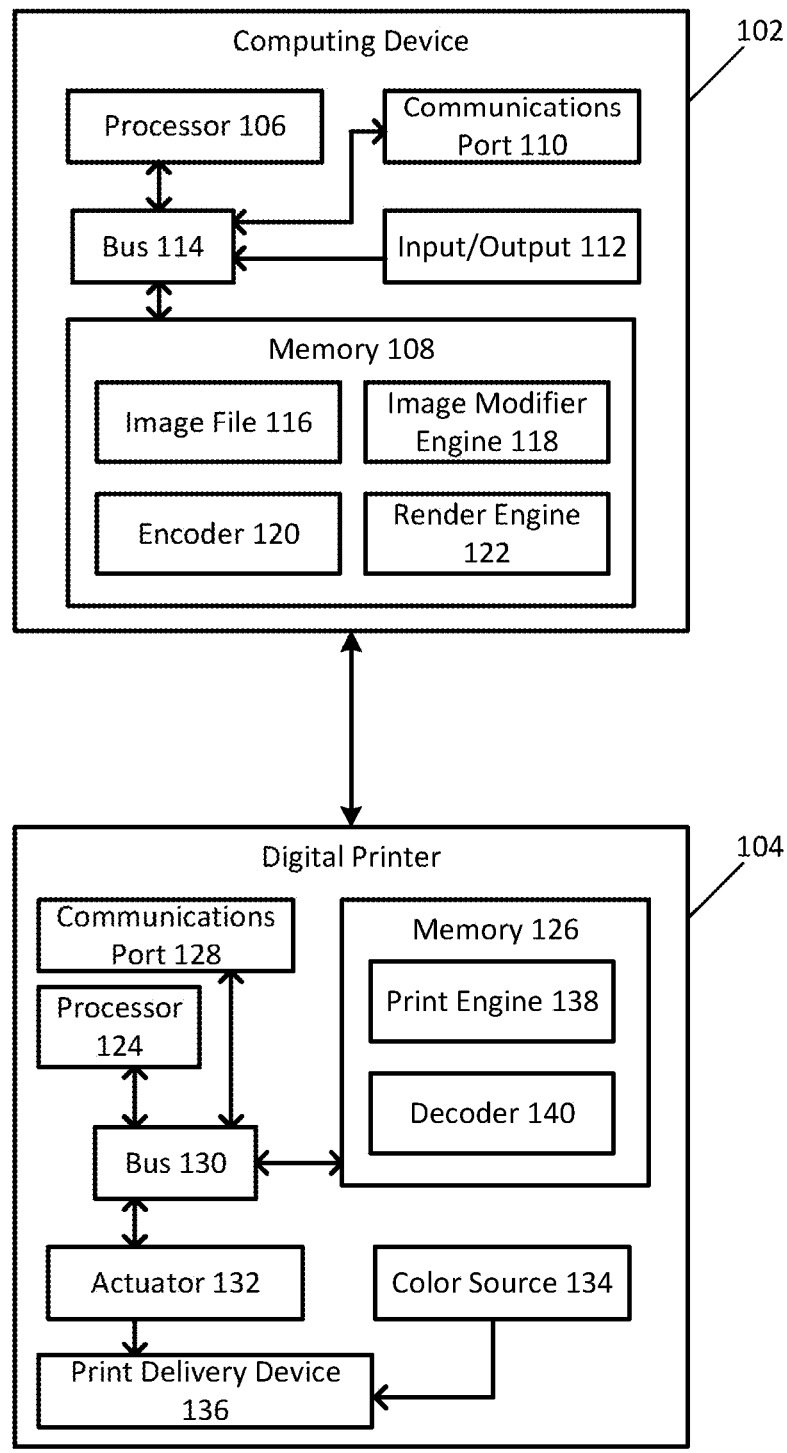
FIG. 1 is a block diagram of a system for digitally printing blanks to form product for flooring or decoration according to one example of the present disclosure.

Certain aspects and features relate to using an image modifier to generate digital designs and to printing the digital designs on a structure for flooring or other decoration that can more realistically mimic designs found in nature or otherwise provide designers with the freedom to create aesthetic designs more easily. An image modifier can receive an image, such as an image of a naturally occurring view and generate modified designs based on the image. The modified designs can be slight modifications to the image and printed on the structures for flooring such that together the printed structures exhibit the appearance of a design found in nature or a desired appearance by a designer.

Printing the digital design can involve applying a color to a substrate (also referred to as a "blank" prior to being printed) and depth—such as by adding material to, or removing material from, the substrate. An initial design can be automatically and randomly modified for printing on subsequent substrates that will make up a flooring or decoration to mimic variations in designs found in nature and more realistically appear similar to designs found in nature.

The design or image can be applied to the image modifier that applies different image techniques to the design to create enough variation to apply to the blanks. In some examples, the image modifier can apply a high dynamic range, where a series of images of different exposure can be manipulated to provide as much realism as possible. The image modifier can manipulate small pattern repeats to give the illusion of large or no pattern repeat. The design files can be high definition, which can result in high quality realistic renderings. The printer can include a print render application to manage and process these high quality large image size files.

Flooring and decorations can be modular and formed by positioning printed substrates (also referred to as "blanks" prior to being printed) with respect to each other to form an aesthetic pattern. By varying a design that is printed onto multiple substrates, the aesthetic pattern can appear more realistic. For example, laminate substrates can be printed to have a varying wood-appearance design that avoids duplicating exactly a print design on two or more substrates. By varying the design printed on each substrate, the unique appearance from a natural wood appearance can be more closely replicated.

For example, an image may be captured of flooring made from real wood. The real wood may have specific features, such as darkened areas, imperfections, or diverging grains, which are unique to that piece of flooring. The flooring may be substantially similar to other wood flooring formed from the same or similar tree, but the specific features may different, even if slightly. A system according to some examples can generate modified images from the image to reflect differences in those or other specific features. And substrates printed with the modified images can mimic slight differences found in nature from wood flooring to more naturally reflect wood flooring.

The images may be printed on the substrates or printed on a film that is coupled to the substrates or another type of surface. In some examples, a substrate can be etched, have material added, or both to create depth on the surface of the substrate relative to other portions of the substrate, by an etcher or adder. The substrate can be etched or have matter added thereto in accordance with a depth plan that corresponds to locations in which certain colors are planned to be added to reflect depth for the image. In addition or alternatively, a scanner, such as a depth scanner, can scan the substrate to detect depth on the surface from etching or adding material to the substrate. The scan can be used by the system to formulate a depth map for the surface of the substrate. The depth map can be used by a printing control module to determine a location for printing certain colors that make up the image such that the image is printed consistent with the depth created on the substrate to reflect depth in the image.

In additional or alternative examples, a depth-of-shade scanner can be used subsequent to digital printing. For example, a depth-of-shade scanner can scan the printed substrates to detect depth shading and to create a topography map file. An example of the depth of shade scanner is a three-dimensional camera that detects shading in the printed substrate to create a topography map file. A computing device can receive scans from the depth of shade scanner and a processor can execute instructions to create a topography map file from the scans. An encoder can be executed to formulate etch or adder instructions based on the topography map file and characteristics of the etcher or adder. Characteristics of the etcher or adder can be continuously or periodically received by the computing device. Examples of characteristics is the response time by the etcher or adder to perform an action in response to receiving the instruction to perform the action, the time the etcher or adder takes to perform certain actions, etc. The etch or add instructions can be transmitted by the computing device to the etcher or adder. The etcher can etch printed substrates according to the etch instructions and the adder can add material, including colored material, to the printed substrates.

Layers, such as a wear layer and a UV-protection layer, can be added to the substrates subsequent to printing the substrates. A wear layer can applied to the printed substrates to improve the wear resistance of the product. In some examples, the wear layer is a clear layer that can protect the printed portion and the blank. A UV-protection layer can be a layer of material that is transparent to the human view spectrum, but that is opaque to UV rays to protect the flooring or decorative structure from damage as a result of being exposed to UV rays, such as from the Sun.

In some examples, a printing pod can be used for regional printing and finishing for resilient flooring and decorative structures. Design patterns that achieve large pattern repeats at high definition and potentially incorporating a registered topography where contours match the pattern design. A printing pod can receive blanks manufactured prior to printing and pre-cut to a desired size. The printing pod can also receive a digital design that is randomized and applied to the blanks. The printing pod can also create a topography layer by coordinating the speed at which a printed substrate and topography instructions are provided to an etcher based on the speed at which the etcher can physically create a design.

Blanks can be manufactured remotely from a printing pod offsite and then delivered to the location of the printing pod. The specification of the blanks may be compatible to existing products, such as by complying with current size, depth, and sustainability requirements. Blanks can be made from various materials, such as cork, ceramic, wood, carpet, and vinyl tile substrates. In some examples, a laminate is printed with the design and the laminate is applied or coupled to the blank.

FIG. 1 is a block diagram of a system for digitally printing blanks to form product for flooring or decoration according to one example of the present disclosure.

The system includes a computing device 102 and a digital printer 104. The computing device 102 can output commands and other instructions or information to the digital printer 104. The digital printer 104 can print designs and images onto a substrate for flooring or other decorative structure. The digital printer 104 may be a device that can apply color, patterns, and other shapes, to flooring or other structures used for decoration, in accordance with a digital file or digital instructions. An example of the digital printer 104 is a laminate flooring printer.

The computing device 102 and the digital printer 104 are depicted and described as separate, but communicatively coupled, devices for illustrative purposes only. For example, in other implementations, the computing device 102 and the digital printer 104 are housed in a common housing and the computing device 102 and the digital printer 104 share overlapping sub-systems or devices rather than having separate of such overlapping sub-systems or devices.

The computing device 102 in FIG. 1 includes a processor 106, a memory 108, a communications port 110, an input/output device 112, and a bus 114. The computing device 102 may be implemented as one or more computing devices. In some examples, the components of the computing device 102 can be integrated into a single structure. For example, the components can be within a single housing. In other examples, the components can be distributed (e.g., in separate housings) and in communication with each other.

The processor 106 can execute instructions stored in the memory 108 to perform operations. The processor 106 can include one processing device or multiple processing devices. Non-limiting examples of the processor 106 include a Field-Programmable Gate Array ("FPGA"), an application-specific integrated circuit ("ASIC"), a microprocessor, etc.

The processor 106 can be communicatively coupled to the memory 108 via the bus 114. The memory 108 may include any type of memory device that retains stored information when powered off. Non-limiting examples of the memory 108 include electrically erasable and programmable read-only memory ("EEPROM"), flash memory, or any other type of non-volatile memory. In some examples, at least some of the memory 108 can include a medium from which the processor 106 can read instructions. A computer-readable medium can include electronic, optical, magnetic, or other storage devices capable of providing the processor 106 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The communications port 110 can interface other network devices or network-capable devices, such as the digital printer 104 to analyze and receive information and transmit instructions to other devices or components. Information received by the communications port 110 can be sent to the memory 108 via the bus 114. The memory 108 can store any information received from the communications port 110. The communications port 110 may include wired or wireless transceivers that can communicate signals that include information according to communication protocols for the communication mediums.

The memory 108 can include program code for performing certain operations and for storing data. The memory 108 can include an image file 116 that can represent a design for printing onto blanks. The memory 108 can also include an image modifier engine 118 (which can also be referred to as a random card generator) that can be executed by the processor 106 for generating modified designs of the image file 116 to avoid replication of the original design when printing blanks. The memory 108 can also include an encoder 120 and a render engine 122 that can be executed by the processor 106 to manage providing information form the image file 116 to the digital printer 104. For example, the image file 116 and modifications of it from the image modifier engine 118 may be digital files that are very large because of very high resolution. The encoder 120 can be executed to convert the image file 116 and modifications of it to a format that is smaller sized, while retaining relevant information. The render engine 122 can be executed to split the image file 116 and its modifications into smaller chunks to be fed to the digital printer 104, prior to, subsequent to, or as an alternative to the encoder 120 encoding the files. In other examples, the render engine 122 causes the image file 116 and its modifications to be transmitted as a serial raster via continuous packets of information according to layer priority to the digital printer 104.

The input/output device 112 may allow interactions with users of the computing device 102 and include one or more components. Examples of components include a display, a keyboard, a mouse, a touchscreen, and a laser printer. For example, the input/output device 112 may be used by a user to manipulate the design in the image file 116, specify parameters of the design to be modified, or specify limitations on thresholds of changes to the parameters.

The digital printer 104 can include a processor 124, a memory 126, a communications port 128, and a bus 130. These components may be similarly structured and perform similar functions as the processor 106, memory 108, communications port 110, and the bus 114 of the computing device 102. The digital printer 104 can also include additional components. The additional components can include an actuator 132, a color source 134, and a print delivery device 136. The bus 130 can facilitate communication of information, data, and instructions between the actuator 132 and the other components, such as the processor 124, memory 126, and the communications port 128. The digital printer 104 may be implemented as one or more components. In some examples, the components of the digital printer 104 can be integrated into a single structure. For example, the components can be within a single housing. In other examples, the components can be distributed (e.g., in separate housings) and in communication with each other.

The actuator 132 can be an electro-mechanical device that is capable of receiving commands from instructions stored in the memory 126 that are executed by the processor 124 and causing physical movement of the print delivery device 136 in accordance with those commands. The print delivery device 136 may be a digitally controlled printer that delivers color liquid or other material from the color source 134 to a substrate or blank according to controls from the actuator 132.

The memory 126 can include instructions, such as a print engine 138 and a decoder 140, which can be executed by the processor 124 to perform operations. For example, the decoder 140 can be executed to decode information representing the image file 116 and its modifications that are received from the computing device 102 in an encoded form. The print engine 138 can be executed to formulate instructions that are provided to the actuator 132 to cause the actuator 132 to control the print delivery device 136 to print the image file 116 or its modifications onto substrates.

Figure 2:
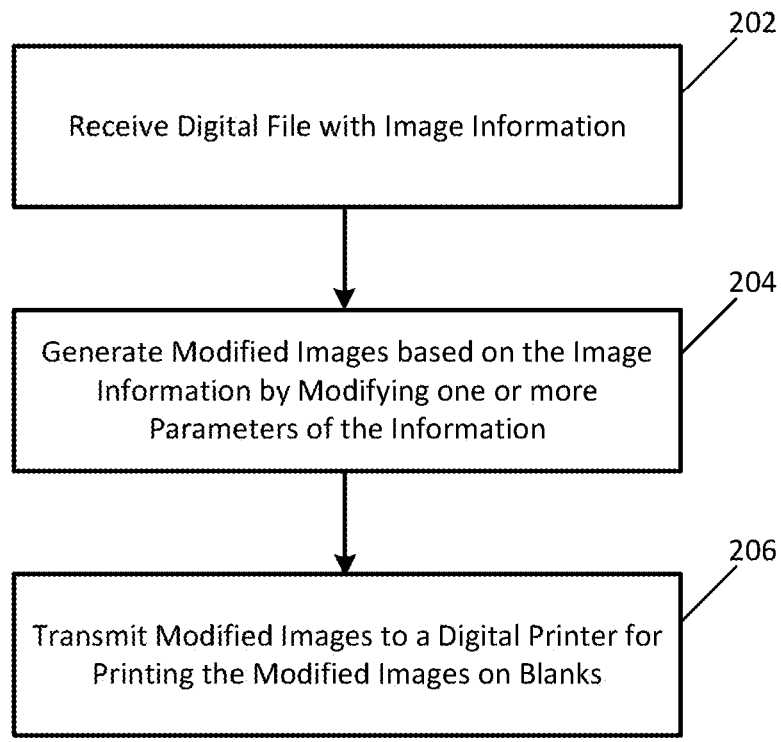
FIG. 2 is a flowchart of a process for digitally printing blanks to form product for flooring or decoration according to one example of the present disclosure.

FIG. 2 is a flowchart of a process for digitally printing blanks to form product for flooring or decoration according to one example of the present disclosure. The process is described with respect to the system of FIG. 1, but other implementations are possible.

In block 202, the computing device 102 receives a digital file with image information. The digital file can be received via a network connection, such as via an electronic communication, from an external storage device such as a thumb drive, from a design that a user generates using the computing device 102, from a picture received via an image acquisition device, or via another process. The image information can include one or more image layers of parameters about the image. Examples of parameters can include color, tone, fading, objects and object outlines, and positional information about these or other types of information.

Figure 3:
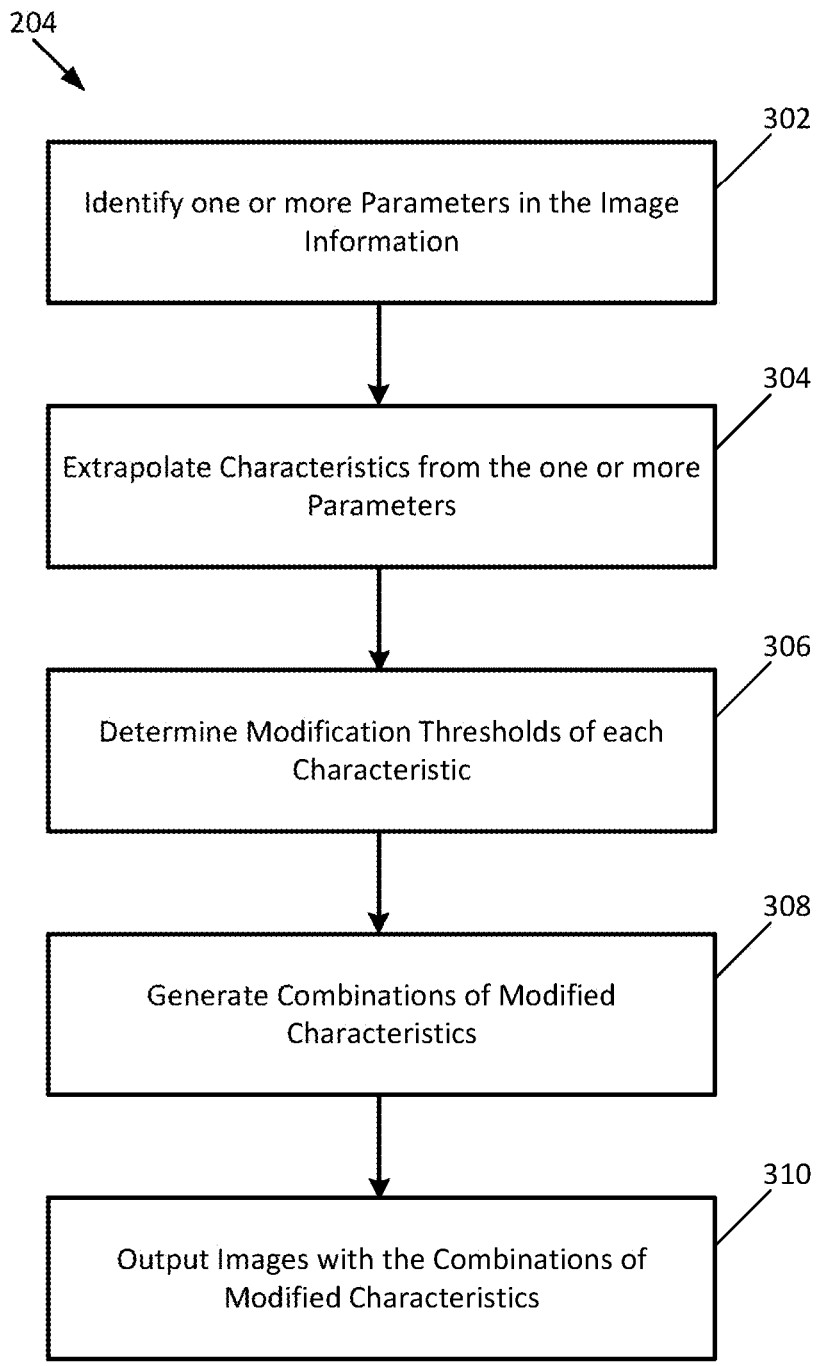
FIG. 3 is a flowchart of a process for generating modified images according to one example of the present disclosure.

In block 204, the computing device 102 generates modified images based on the information by modifying one or more parameters of the information. FIG. 3 is a flowchart of a process for generating modified images according to one example of the present disclosure.

In block 302, the computing device 102 identifies one or more parameters in the image information. The computing device 102 may scan the image to identify the parameters or the computing device 102 may identify parameters reflected in metadata or other code that is received with the image.

In block 304, the computing device 102 extrapolates characteristics from the one or more parameters. An example of a characteristic may be the value of the parameter or the specific data in the parameter type. The characteristics may be extrapolated by the computing device 102 scanning the image to detect values for parameters. For example, the computing device 102 can scan the image, compare data from the scanned image to scales for various characteristics, and determine a value using the scale as a reference, for each characteristic. Additionally or alternatively, the computing device 102 may identify the characteristic for a parameter in metadata or other code representing or being about the image.

In block 306, the computing device 102 determines modification thresholds of each characteristic. A modification threshold may be two or more limits on characteristics of parameters. The limits can define ranges of values in which the characteristic fall. The limits can define the maximum different values for characteristics of modified images as compared to the image. The modification thresholds can be determined by the computing device 102 by identifying the maximum by which a characteristic can vary, determining a percentage of variance by analyzing a set of test images that have been modified for the particular parameter and calculating the average percentage of variance, and setting the modification thresholds according to the average variance. In addition, or alternatively, the computing device 102 can determine the modification thresholds by receiving input from a user. The input may include defined limits, a percentage of variance for each characteristic, different percentages of variance for different characteristic, or modifications to limits generated by the computing device 102.

In block 308, the computing device 102 generates combinations of modified characteristics. As an example, an image may include four different parameters and each parameter has a characteristic. Each characteristic in this example may be modified within determined modification thresholds such that there are ten different characteristics (i.e., values) for each parameter. The combination of modified characteristic can include different combinations of the forty characteristic and parameter pairs by selecting a characteristic for each of the four different parameters from among the ten different characteristic values. The result can be a combination and the computing device 102 can generate multiple combinations.

In block 310, the computing device 102 outputs images with the combinations of modified characteristics as modified images. In some examples, the computing device 102 can output the images onto a display for viewing by a user and receive input that selects or rejects each displayed modified image. The selected modified images can be stored for use with a digital printer.

Returning to FIG. 2, in block 206, the computing device 102 transmits the modified images to the digital printer 104 for printing the modified images on blanks. The digital printer 104 can interpret the modified images and generate instructions for controlling a print delivery device to apply the modified images onto blanks. In some examples, the modified images can be applied to the blanks such that each blank is printed to reflect a different image as compared to other blanks in a set of blanks.

Figure 4:
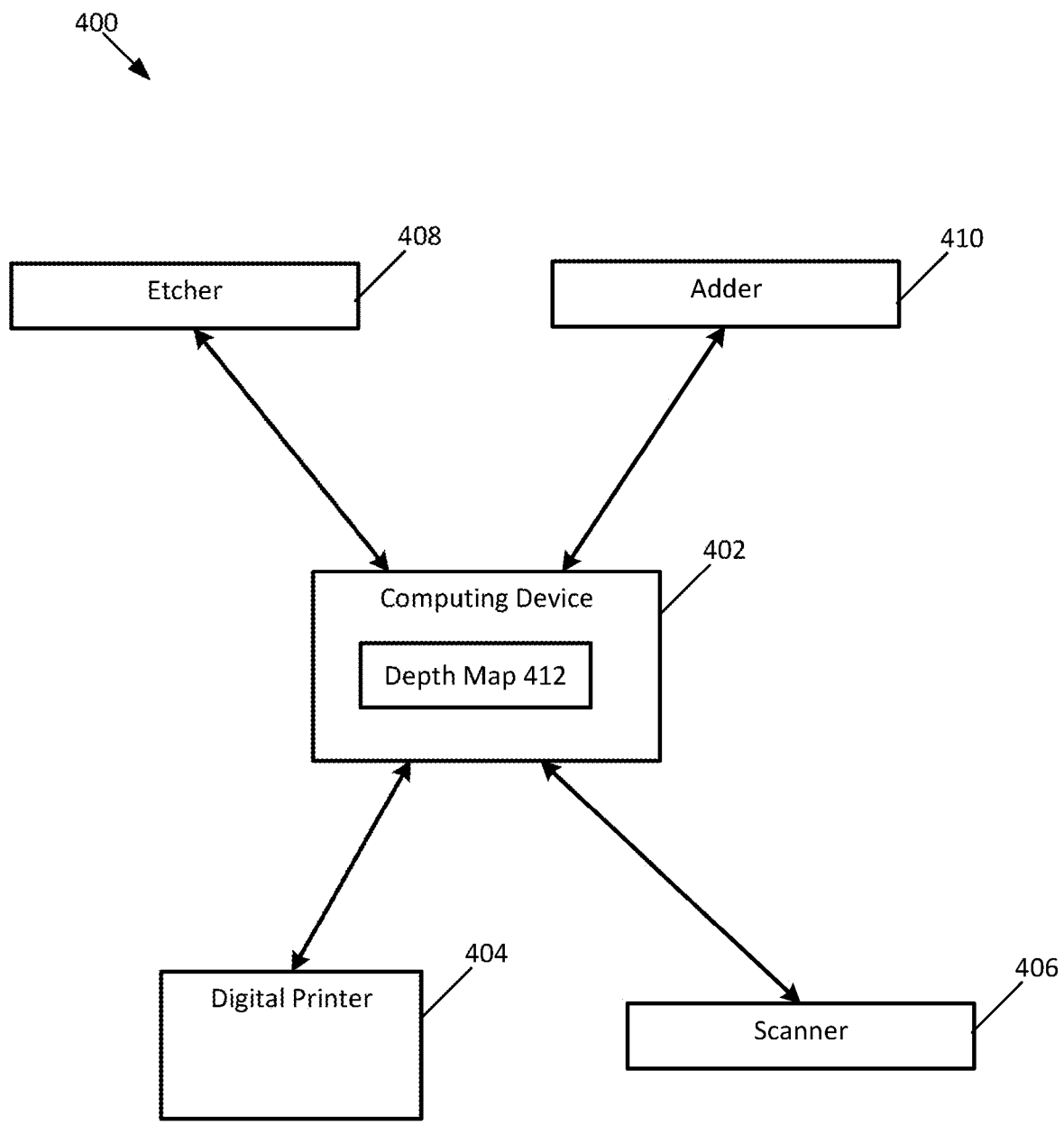
FIG. 4 is a block diagram of a system that includes components for creating depth or the perception of depth in a digitally printed blank according to one example of the present disclosure.

A printing system according to some examples can also be used to create depth on the printed blank or the perception of depth of a printed blank. FIG. 4 is a block diagram of a system 400 that includes components for creating depth or the perception of depth in a digitally printed blank according to one example of the present disclosure. Although certain components are shown in the example of FIG. 4, in other examples, the system 400 may include fewer or more components that are shown.

The system 400 includes a computing device 402, a digital printer 404, a scanner 406, an etcher 408, and an adder 410. The computing device 402 may be similar to the computing device 102 of FIG. 1, except that the computing device 402 can store a depth map 412 in memory and use the depth map 412 for instructing other components on creating depth or the perception of depth in the printed blank. The digital printer 404 can be similar to the digital printer 104 of FIG. 1. The scanner 406 can be a depth-scanner or a depth-of-shade scanner to capture information about depth in a blank. Examples of the scanner 406 include a camera and a three-dimensional scanner to capture 3D information about a blank. The etcher 408 can be a device that can remove material from a blank and the adder 410 can be a device that adds material to a blank. Although depicted as separate components, in other examples the etcher 408 and adder 410 can be included in the same component.

The components of the system 400 can be used to create depth or the perception of depth using a variety of different processes. In an example, the depth map 412 can be formed that includes information on intended depth associated with an image. The information may include positional information representing the location of depth values on a blank or substrate. The positional information can be received with metadata associated with the image, from analyzing the image and identifying characteristics of the parameter of depth for the image, from input from a user, by scanning the blank or substrate using the scanner 406 to identify depth information already present on the blank or substrate, or another source. The depth map 412 can be used to instruct the etcher 408 or the adder 410 to create depth values and locations on the blank using the positional information in the depth map 412. The etcher 408, the adder 410, or both can remove or add depth to the substrate prior to the substrate being printed by the digital printer 404.

In another example, the digital printer 404 can print modified images onto the substrate, such as by printing according to the process described with respect to FIGS. 2 and 3. The scanner 406 can scan a printed substrate to detect information about the appearance of depth in the printed substrate. The information can be communicated to the computing device 402, which can use the information to form the depth map 412 to include positional information for depth values. The depth map 412 can be used to instruct the etcher 408, the adder 410, or both to create depth in the printed substrate. The printed substrate may either be complete or the digital printer 404 can reprint the portions of the substrate modified to represent depth.

In a further example, the digital printer 404 can print modified images on substrates, a liquid or other substance is applied to the printed substrates, and the depth map 412 can be used to instruct the etcher 408 to remove portions of the liquid or other substance to create depth or the appearance of depth in the printed substrates.

Another example can include the etcher 408, adder 410, or both modifying a substrate to create depth. The scanner 406 can scan the modified substrate to determine depth information and the information can be used by the computing device 402 to formulate the depth map 412 with positional information for the depth on the substrate. The depth map 412 can be used to modify characteristics of parameters of an image to create a modified image. The modified image information can be provided to the digital printer 404 to print the modified image.

In other examples, the system 400 can also include a source of blanks, a wear layer applicator, an ultraviolet (UV) protection applicator, and a packager. An example of a source of blanks can include pre-cut blanks manufactured at a different location than the system 400 and delivered in packaged form to the location of the system 400. The wear layer applicator can apply a wear-resistant layer to the printed substrate. The UV protection applicator can apply a layer of protection from ultraviolet energy to the printed substrate to reduce wear on the printed substrate from UV light after being positioned at a location. The packager can be used to collate and wrap or otherwise package the printed substrates for shipment to a seller or to a location for installation.

Figure 5:
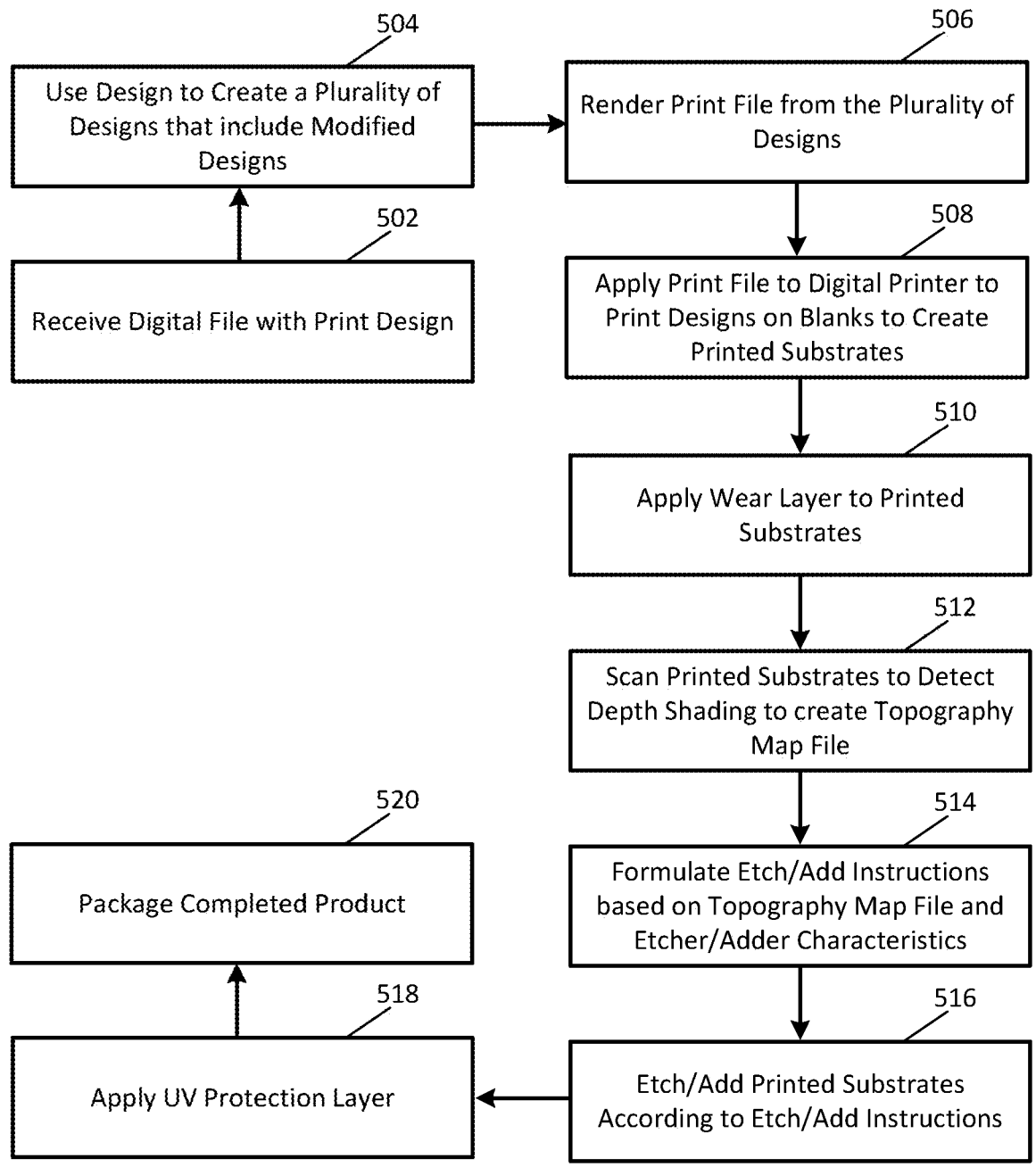
FIG. 5 is a flowchart of a process for digitally printing flooring or other type of decoration according to another example of the present disclosure.

FIG. 5 is a flowchart of a process for digitally printing flooring or other type of decoration according to another example of the present disclosure. The process depicted in FIG. 5 can be combined or implemented, in whole or in part, with the examples depicted or described with respect to FIGS. 1 to 4.

In block 502, a computing device receives a digital file with a print design. The computing device can receive the digital file via the communications port from an external source or by a designer creating the design using the computing device. The digital file can include one or more designs with print instructions and may appear similar to a photograph. The digital file can include a series of layers with information about the design, such as color, exposure, topography, etc.

In block 504, an image modifier engine or a random card generator is executed to create a set of multiple designs that include the original print design represented by the digital file and one or more variations of the original print design. For example, elements from the design file can be modified slightly, such as varying the shadowing and lighting, to create modified designs to be included in the print process. The image modifier engine or the random card generator can select one or more elements and modify each element slightly to avoid significantly changing the original design, but creating variety in the design such that the printed substrates, when installed, appear more similar to a natural design, such as wood, than otherwise.

In block 506, a render engine is executed to transform the designs to a rendered print file. The rendered print file can be in a form that can be used to instruct the digital printer. Because the digital file with the designs may be very large, due to high resolution and multiple layers of information, the render engine can be executed to break down the digital file into chunks that can be fed to the digital printer, or transmit as a serial raster via continuous packets of information. The priority of layers that are sent to the printer may also be managed.

In block 508, the print file is applied to a digital printer to print designs on blanks that are fed into the digital printer. The print file can be transmitted via the communications port to the digital printer, which may include a processor and memory to store the print file for executing the print file and controlling the application of color, texture, or other features on the blanks in accordance with the print file.

In block 510, a wear layer is applied to the printed substrates to improve the wear resistance of the product. In some examples, the wear layer is a clear layer that can protect the printed portion and the blank.

In block 512, a depth-of-shade scanner scans the printed substrates to detect depth shading and to create a topography map file. An example of the depth-of-shade scanner is a three-dimensional camera that detects shading in the printed substrate to create a topography map file. The computing device can receive scans from the depth-of-shade scanner and the processor can execute instructions to create the topography map file from the scans.

In block 514, the encoder is executed to formulate etch/add instructions based on the topography map file and characteristics of the etcher. Characteristics of the etcher/adder can be continuously or periodically received by the computing device. Examples of characteristics is the response time by the etcher/adder to perform an action in response to receiving the instruction to perform the action, the time the etcher/adder takes to perform certain actions, etc. The etch/add instructions can be transmitted by the computing device to the etcher/adder.

In block 516, the etcher/adder etches, adds, or both etches and adds printed substrates according to the etch instructions. Etching the printed substrates can include removing material from the substrate.

In block 518, a UV protection layer is applied to the etched substrates. And in block 520, the substrates are packaged for shipment to a retailer or to an installation location.

Modified images can be printed onto substrates (i.e., blanks) according to various examples, including the following examples:

Example 1 is a system comprising: a digital printer configured to print modified images onto blanks for flooring or other decoration; and a computing device comprising a processor and a non-transitory computer-readable medium having instructions stored thereon that are executable by the processor to perform operations comprising: receiving a digital file with image information; generating the modified images based on the image information by modifying one or more parameters of the information; and transmitting the modified images to the digital printer.

Example 2 is the system of example 1, wherein generating the modified images based on the image information by modifying the one or more parameters of the information includes the operations of: identifying the one or more parameters in the image information; extrapolating a plurality of characteristics from the one or more parameters; determining modification thresholds for the plurality of characteristics; generating combinations of modified characteristics; and outputting images with the combination of the modified characteristics.

Example 3 is the system of example 2, wherein parameters are types of information about the image included in the digital file, characteristics are values for the types of information, each modification threshold includes two or more limits on a characteristic of a parameter, and the two or more limits define a range of values in which the characteristic of the parameter falls.

Example 4 is the system of example 2, wherein generating the combinations of modified characteristics includes the operations of: selecting a modified characteristic for each parameter; and generating a modified image that includes at least one characteristic that is a different value than the value of the parameter for the at least one characteristic in the image information included in the digital file.

Example 5 is the system of example 1, wherein the operations further include: prior to transmitting the modified images to the digital printer, outputting the modified images to a display device; and receiving a selection of a subset of the modified images, wherein transmitting the modified images to the digital printer includes the operation of transmitting the subset of the modified images to the digital printer.

Example 6 is the system of example 1, wherein transmitting the modified images to the digital printer includes the operations of: encoding the modified images for transmission via a medium to the digital printer.

Example 7 is the system of example 1, wherein the non-transitory computer-readable medium includes a depth map with information about intended depth for printed blanks.

Example 8 is the system of example 7, wherein the operations further include: receiving scanned information about a blank modified using at least one of an etcher or an adder; including positional information from the scanned information about depth of the blank in the depth map; and using the depth map to generate a modified image to transmit to the digital printer to print onto the blank.

Example 9 is the system of example 1, further comprising: a wear applicator configured to apply a wear layer to printed blanks from the digital printer; a scanner configured to scan the printed blanks from the digital printer to detect depth shading to create a topography map file; an etcher/adder configured to etch/add the printed blanks from the digital printer according to instructions formed by the computing device based on the topography map file; an ultraviolet (UV) protection applicator configured to apply a UV protection layer to the printed blanks from the etcher/adder; and a packager configured to package the printed blanks.

Example 10 is a computing device comprising: a processor; and a non-transitory computer-readable medium having instructions stored thereon that are executable by the processor to perform operations comprising: receiving a digital file with image information; generating modified images based on the image information by modifying one or more parameters of the information; and transmitting the modified images to a digital printer for printing the modified images onto blanks for flooring or other decoration.

Example 11 is the computing device of example 10, wherein generating the modified images based on the image information by modifying the one or more parameters of the information includes the operations of: identifying the one or more parameters in the image information; extrapolating a plurality of characteristics from the one or more parameters; determining modification thresholds for the plurality of characteristics; generating combinations of modified characteristics; and outputting images with the combination of the modified characteristics.

Example 12 is the computing device of example 11, wherein parameters are types of information about the image included in the digital file, characteristics are values for the types of information, each modification threshold includes two or more limits on a characteristic of a parameter, and the two or more limits define a range of values in which the characteristic of the parameter falls.

Example 13 is the computing device of example 11, wherein generating the combinations of modified characteristics includes the operations of: selecting a modified characteristic for each parameter; and generating a modified image that includes at least one characteristic that is a different value than the value of the parameter for the at least one characteristic in the image information included in the digital file.

Example 14 is the computing device of example 10, wherein the operations further include: prior to transmitting the modified images to the digital printer, outputting the modified images to a display device; and receiving a selection of a subset of the modified images, wherein transmitting the modified images to the digital printer includes the operation of transmitting the subset of the modified images to the digital printer.

Example 15 is the computing device of example 10, wherein transmitting the modified images to the digital printer includes the operations of: encoding the modified images for transmission via a medium to the digital printer.

Example 16 is the computing device of example 10, wherein the non-transitory computer-readable medium includes a depth map with information about intended depth for printed blanks.

Example 17 is the computing device of example 16, wherein the operations further include: receiving scanned information about a blank modified using at least one of an etcher or an adder; including positional information from the scanned information about depth of the blank in the depth map; and using the depth map to generate a modified image to transmit to the digital printer to print onto the blank.

Example 18 is a method comprising: receiving, by a computing device, a digital file with image information; generating, by a computing device, modified images based on the image information by modifying one or more parameters of the information; and transmitting, by the computing device, the modified images to a digital printer for printing the modified images onto blanks for flooring or other decoration.

Example 19 is the method of example 18, wherein generating the modified images based on the image information by modifying the one or more parameters of the information includes: identifying the one or more parameters in the image information; extrapolating a plurality of characteristics from the one or more parameters; determining modification thresholds for the plurality of characteristics; generating combinations of modified characteristics; and outputting images with the combination of the modified characteristics.

Example 20 is the method of example 19, wherein parameters are types of information about the image included in the digital file, characteristics are values for the types of information, each modification threshold includes two or more limits on a characteristic of a parameter, and the two or more limits define a range of values in which the characteristic of the parameter falls.

Example 21 is the method of example 18, further comprising: receiving scanned information about a blank modified using at least one of an etcher or an adder; including positional information from the scanned information about depth of the blank in a depth map with information about intended depth for printed blanks; and using the depth map to generate a modified image to transmit to the digital printer to print onto the blank.

The foregoing description of certain examples, including illustrated examples, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:

1. A system comprising:
    a digital printer configured to print images received from a computing device onto blanks for flooring or other decoration to form a plurality of printed blanks such that each printed blank of the plurality of printed blanks depicts an image that is of a common appearance as images on other printed blanks of the plurality of printed blanks but that is different in at least one aspect as compared to the images on the other printed blanks of the plurality of printed blanks;
    a scanner configured to scan the plurality of printed blanks from the digital printer to detect depth shading to create a topography map file;
    an etcher device configured to remove material from the plurality of printed blanks according to instructions received from the computing device that are based on the topography map file; and
    an adder device configured to add material to the plurality of printed blanks according to instructions received from the computing device that are based on the topography map file.

2. The system of claim 1, further comprising:
    a wear applicator configured to apply a wear layer to the plurality of printed blanks from the digital printer;
    an ultraviolet (UV) protection applicator configured to apply a UV protection layer to the plurality of printed blanks; and
    a packager configured to package the plurality of printed blanks.

3. The system of claim 1, wherein the digital printer is configured to receive digital images from the computing device that is configured to generate the digital images by:
    receiving a digital file with image information; and generating the digital images based on the image information by modifying one or more parameters of the image information through operations that include:
  identifying the one or more parameters in the image information;
  extrapolating a plurality of characteristics from the one or more parameters;
  determining modification thresholds for the plurality of characteristics;
  generating combinations of modified characteristics; and
  outputting images with the combinations of the modified characteristics.

4. The system of claim 3, wherein:
parameters are types of information about an image included in the digital file, characteristics are values for the types of information,
each modification threshold includes two or more limits on a characteristic of a parameter, and
the two or more limits define a range of values in which the characteristic of the parameter falls.

5. The system of claim 1, wherein the digital printer is configured to receive an encoded file that includes the images.

6. The system of claim 1, wherein the etcher device and the adder device are each configured to receive instructions from the computing device that includes positional information from scanned information from the scanner about depth of the blank in a depth map.

7. The system of claim 1, wherein the system comprises the computing device, wherein the etcher device and the adder device are disposed in a single device.

8. A method comprising:
receiving, by a digital printer, image data from a computing device;
printing, by the digital printer, images in the image data onto blanks for flooring or other decoration to form a plurality of printed blanks such that each printed blank of the plurality of printed blanks depicts an image that is of a common appearance as images on other printed blanks of the plurality of printed blanks but that is different in at least one aspect as compared to the images on the other printed blanks of the plurality of printed blanks;
scanning, by a scanner, the plurality of printed blanks from the digital printer to detect depth shading to create a topography map file;
removing, by an etcher device, material from the plurality of printed blanks according to instructions received from the computing device that are based on the topography map file; and
adding, by an adder device, additional material to the plurality of printed blanks according to instructions received from the computing device that are based on the topography map file.

9. The method of claim 8, further comprising:
applying a wear layer to the plurality of printed blanks from the digital printer;
applying a UV protection layer to the plurality of printed blanks; and
packaging the plurality of printed blanks.

10. The method of claim 8, wherein receiving, by the digital printer, the image data from the computing device comprises receiving the image data that includes digital images generated by the computing device performing a process that includes:
receiving a digital file with image information; and
generating the digital images based on the image information by modifying one or more parameters of the image information through operations that include:
  identifying the one or more parameters in the image information;
  extrapolating a plurality of characteristics from the one or more parameters;
  determining modification thresholds for the plurality of characteristics;
  generating combinations of modified characteristics; and
  outputting images with the combinations of the modified characteristics.

11. The method of claim 10, wherein:
parameters are types of information about an image included in the digital file, characteristics are values for the types of information,
each modification threshold includes two or more limits on a characteristic of a parameter, and
two or more limits define a range of values in which the characteristic of the parameter falls.

12. The method of claim 8, wherein receiving, by the digital printer, the image data from the computing device comprises receiving an encoded file that includes digital images.

13. The method of claim 8, further comprising the etcher device and the adder device receiving instructions from the computing device that includes positional information from scanned information from the scanner about depth of the blank in a depth map.

14. The method of claim 8, wherein the etcher device and the adder device are disposed in a single device.

15. Flooring for an area, the flooring comprising:
a plurality of printed substrates with images on the plurality of printed substrates such that each printed substrate of the plurality of printed substrates depicts an image that is of a common appearance as the images on other printed substrates of the plurality of printed substrates but that is different in at least one aspect as compared to the images on the other printed substrates of the plurality of printed substrates,
wherein the plurality of printed substrates are configured to be formed using:
  a digital printer configured to print the images using image data received from a computing device;
  a scanner configured to scan the plurality of printed substrates from the digital printer to detect depth shading to create a topography map file;
  an etcher device configured to remove material from the plurality of printed substrates according to instructions received from the computing device that are based on the topography map file; and
  an adder device configured to add material to the plurality of printed substrates according to instructions received from the computing device that are based on the topography map file.

16. The flooring of claim 15, wherein the plurality of printed substrates are configured to be formed using:
a wear applicator configured to apply a wear layer to the plurality of printed substrates from the digital printer;
an ultraviolet (UV) protection applicator configured to apply a UV protection layer to the plurality of printed substrates; and
a packager configured to package the plurality of printed substrates.

17. The flooring of claim 15, wherein the plurality of printed substrates are positionable with respect to each other such that the images visually depict a design found in nature.

18. The flooring of claim 17, wherein the digital printer is configured to receive digital images from the computing device that is configured to generate the digital images by:
   receiving a digital file with image information; and
   generating the digital images based on the image information by modifying one or more parameters of the image information through operations that include:
      identifying the one or more parameters in the image information;
      extrapolating a plurality of characteristics from the one or more parameters;
      determining modification thresholds for the plurality of characteristics;
      generating combinations of modified characteristics; and
      outputting images with the combinations of the modified characteristics.

19. The flooring of claim 15, wherein the flooring is modular and configured to be formed by positioning printed substrates of plurality of printed substrates with respect to each other.

20. The flooring of claim 15, wherein each printed substrate of the plurality of printed substrates has a unique image as compared to the images on the other printed substrates of the plurality of printed substrates.

* * * * *